(12) United States Patent
Brees et al.

(10) Patent No.: US 7,850,420 B2
(45) Date of Patent: Dec. 14, 2010

(54) TWO-PART STATOR BLADE

(75) Inventors: William Brees, Wooster, OH (US); Christopher Shamie, Wadsworth, OH (US); Aliihsan Karamavruc, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 922 days.

(21) Appl. No.: 11/728,066

(22) Filed: Mar. 23, 2007

(65) Prior Publication Data

US 2007/0224042 A1 Sep. 27, 2007

Related U.S. Application Data

(60) Provisional application No. 60/785,739, filed on Mar. 24, 2006.

(51) Int. Cl.
*F04D 29/44* (2006.01)

(52) U.S. Cl. .................. 415/146; 415/147; 415/161; 415/208.2; 416/180; 60/345; 60/362; 60/365

(58) Field of Classification Search .................. 415/23, 415/62, 146, 147, 161, 166; 416/180; 60/345, 60/362, 365
See application file for complete search history.

(56) References Cited

U.S. PATENT DOCUMENTS

| | | | | |
|---|---|---|---|---|
| 2,588,668 | A | * | 3/1952 | Syrovy ........................ 60/338 |
| 2,755,628 | A | | 7/1956 | Mamo |
| 3,014,430 | A | | 12/1961 | Schneider |
| 3,244,400 | A | | 4/1966 | Saunders |
| 3,354,643 | A | | 11/1967 | Parades |
| 3,385,060 | A | * | 5/1968 | Lazarus ........................ 60/341 |
| 3,572,034 | A | | 3/1971 | Fisher |
| 4,377,068 | A | * | 3/1983 | Braatz ........................ 60/342 |
| 4,848,084 | A | * | 7/1989 | Wirtz ........................ 415/147 |
| 5,307,629 | A | * | 5/1994 | By et al. ........................ 60/342 |

(Continued)

FOREIGN PATENT DOCUMENTS

DE 1193758 5/1965

(Continued)

OTHER PUBLICATIONS

U.S. Appl. No. 11/726,881 George et al. filed Mar. 23, 2007.

(Continued)

*Primary Examiner*—Igor Kershteyn
(74) *Attorney, Agent, or Firm*—Simpson & Simpson, PLLC (57) ABSTRACT

The present invention broadly comprises a blade for a torque converter stator including a first blade segment connected to inner and outer circumferential sections of the stator and a second blade segment, separately formed from the first blade segment, and connected to the circumferential sections. In some aspects, the blade segments are: in contact along edges, overlapped, circumferentially misaligned, at least partially folded, stamped, or cast. Configurations of the blade segments can be selected to modify performance characteristics of the stator such as torque ratio, efficiency, and capacity. In some aspects, the blade segments are in a circumferential alignment, and the stator includes an alignment element operatively arranged to control the circumferential alignment, for example, in response to pressure from fluid in the stator upon the blade. In some aspects, the stator includes axial halves, separately formed and fixedly connected and the blade segments are connected to respective halves.

21 Claims, 7 Drawing Sheets

U.S. PATENT DOCUMENTS

| | | |
|---|---|---|
| 2004/0237516 A1 | 12/2004 | Shin |
| 2007/0045076 A1 | 3/2007 | Brees et al. |
| 2007/0137977 A1 | 6/2007 | Peri et al. |
| 2007/0140841 A1 | 6/2007 | George et al. |

FOREIGN PATENT DOCUMENTS

| | | |
|---|---|---|
| DE | 3931427 | 4/1990 |
| EP | 0276411 | 8/1988 |
| GB | 2042690 | 9/1980 |
| WO | 2004/020874 | 3/2004 |

OTHER PUBLICATIONS

U.S. Appl. No. 11/728,068 Hemphill et al. filed Mar. 23, 2007.

* cited by examiner

TWO-PART STATOR BLADE

CROSS-REFERENCE TO RELATED APPLICATIONS

This application claims the benefit under 35 U.S.C. §119(e) of U.S. Provisional Application No. 60/785,739 filed Mar. 24, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a torque converter stator blade with two-separately formed axial segments. More specifically, the stator has stamped axial halves and the segments are integrally formed with the respective halves.

BACKGROUND OF THE INVENTION

One-piece blades in stators are known. Two-piece stator blades also are known, for example, as described in U.S. Patent Application Publication No. US 2004/0237516 A1 (Shin). Unfortunately, the blade segments in Shin are radially separated. That is, one segment is connected to an outer circumference of the stator and the other segment is connected to an inner circumference of the stator. Thus, any manipulation of fluid flow through the blades is substantially limited to flow along radial planes.

Thus, there is a long-felt need for a stator having blades with axial segments.

BRIEF SUMMARY OF THE INVENTION

The present invention broadly comprises a blade for a stator in a torque converter including a first blade segment connected to inner and outer circumferential sections of the stator and a second blade segment, separately formed from the first blade segment, and connected to the inner and outer circumferential sections. In some aspects, the first and second blade segments are in contact, the first and second blade segments include respective edges and the first and second blade segments are in contact along the respective edges, or at least one of the respective first edges is coined. In some aspects, the first and second blade segments include respective surfaces and the respective surfaces are at least partially overlapped or the first and second blade segments are circumferentially off-set. In some aspects, the first or second blade segment is at least partially folded, the blade is stamped, or the blade is cast.

In some aspects, the stator includes performance characteristics, the first and second blade segments are in respective configurations, and the respective configurations are selected to modify the performance characteristics. In some aspects, the performance characteristics are selected from the group consisting of torque ratio, efficiency, and capacity and the respective configurations are selected from the group consisting of axial, radial, and circumferential alignment.

In some aspects, the first and second blade segments are in circumferential alignment and the stator includes an alignment element operatively arranged to control the circumferential alignment. In some aspects, the torque converter includes fluid and the alignment element is arranged to control the alignment in response to pressure from the fluid upon the blade.

In some aspects, the stator includes a first axial half and a second axial half, the first and second axial halves are separately formed and fixedly connected, the first blade segment is connected to the first axial half, and the second blade segment is connected to the second axial half. The fixed connection is selected from the group consisting of rivets, folded tabs, welds, adhesive, and crimps. In some aspects, the first blade segment is formed integrally with the first axial half and the second blade segment is formed integrally with the second axial half.

In some aspects, the stator includes a clutch and the first and second axial halves are arranged to form first and second axial ends of the clutch, respectively.

The present invention also broadly comprises a blade for a stator in a torque converter including a first blade segment integrally formed with inner and outer circumferential sections of the stator and a second blade segment, separately formed from the first blade segment and integrally formed with the inner and outer circumferential sections The inner and outer circumferential sections define an annulus for the stator and the first and second blade segments and the inner and outer circumferential sections are stamped.

The present invention further broadly comprises a blade for a stator in a torque converter including a first blade segment integrally formed with a first axial half for the stator and connected to first inner and outer circumferential sections of the first axial half and a second blade segment, separately formed from the first blade segment, integrally formed with a second axial half for the stator and connected to second inner and outer circumferential sections of the second axial half. The first and second axial halves are separately formed and fixedly connected.

It is a general object of the present invention to provide a blade for a stator that can be formed in a wide variety of configurations.

It is another object of the present invention to provide a blade for a stator that can be formed of axially separate segments.

It is yet another object of the present invention to provide a multi-segment blade for a stator with a variable off-set between segments.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 18A:
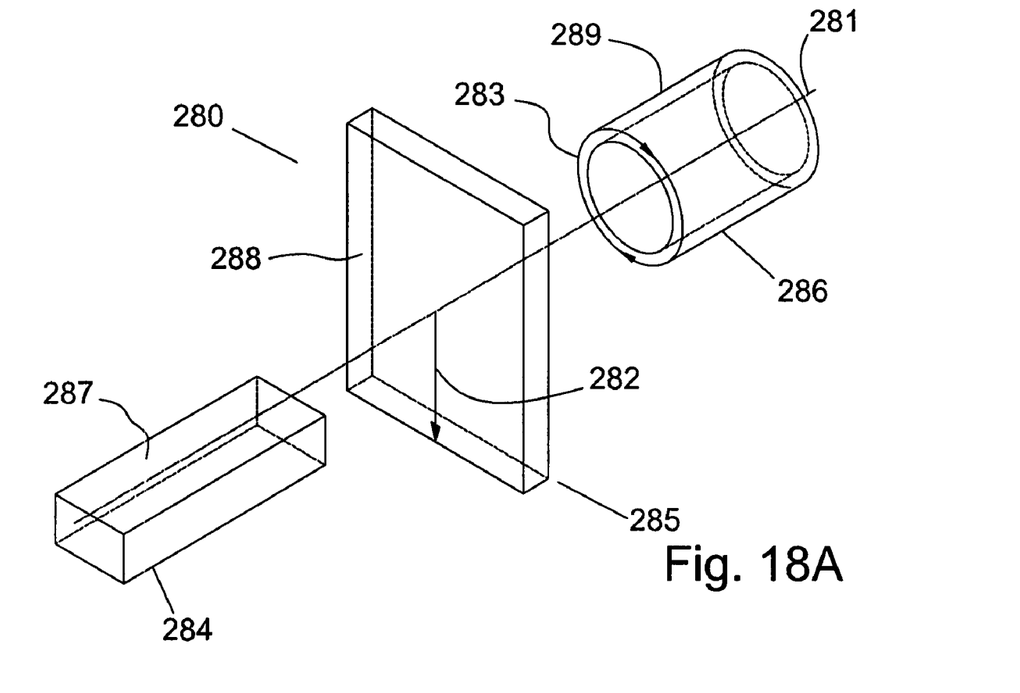
FIG. 18A is a perspective view of a cylindrical coordinate system demonstrating spatial terminology used in the present application; and, FIG. 18B is a perspective view of an object in the cylindrical coordinate system of FIG. 18A demonstrating spatial terminology used in the present application.

FIG. 18A is a perspective view of cylindrical coordinate system 280 demonstrating spatial terminology used in the present application. The present invention is at least partially described within the context of a cylindrical coordinate system. System 280 has a longitudinal axis 281, used as the reference for the directional and spatial terms that follow. The adjectives "axial," "radial," and "circumferential" are with respect to an orientation parallel to axis 281, radius 282 (which is orthogonal to axis 281), and circumference 283, respectively. The adjectives "axial," "radial" and "circumferential" also are regarding orientation parallel to respective planes. To clarify the disposition of the various planes, objects 284, 285, and 286 are used. Surface 287 of object 284 forms an axial plane. That is, axis 281 forms a line along the surface. Surface 288 of object 285 forms a radial plane. That is, radius 282 forms a line along the surface. Surface 289 of object 286 forms a circumferential plane. That is, circumference 283 forms a line along the surface. As a further example, axial movement or disposition is parallel to axis 281, radial movement or disposition is parallel to radius 282, and circumferential movement or disposition is parallel to circumference 283. Rotation is with respect to axis 281.

The adverbs "axially," "radially," and "circumferentially" are with respect to an orientation parallel to axis 281, radius 282, or circumference 283, respectively. The adverbs "axially," "radially," and "circumferentially" also are regarding orientation parallel to respective planes.

Figure 18B:
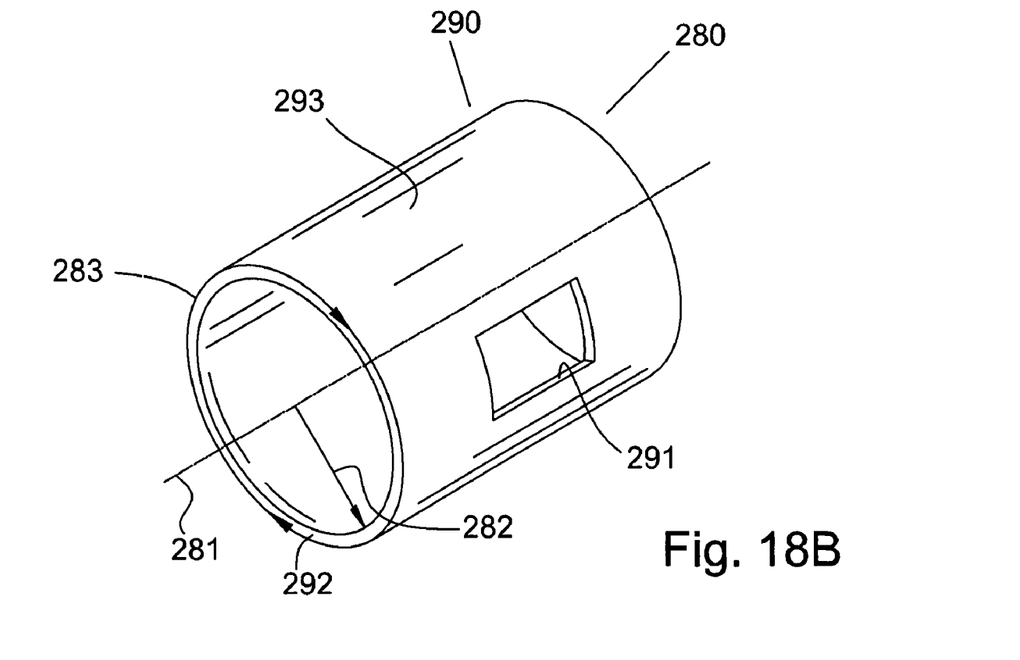

FIG. 18B is a perspective view of object 290 in cylindrical coordinate system 280 of FIG. 18A demonstrating spatial terminology used in the present application. Cylindrical object 290 is representative of a cylindrical object in a cylindrical coordinate system and is not intended to limit the present invention is any manner. Object 290 includes axial surface 291, radial surface 292, and circumferential surface 293. Surface 291 is part of an axial plane, surface 292 is part of a radial plane, and surface 293 is part of a circumferential plane.

Figure 1:
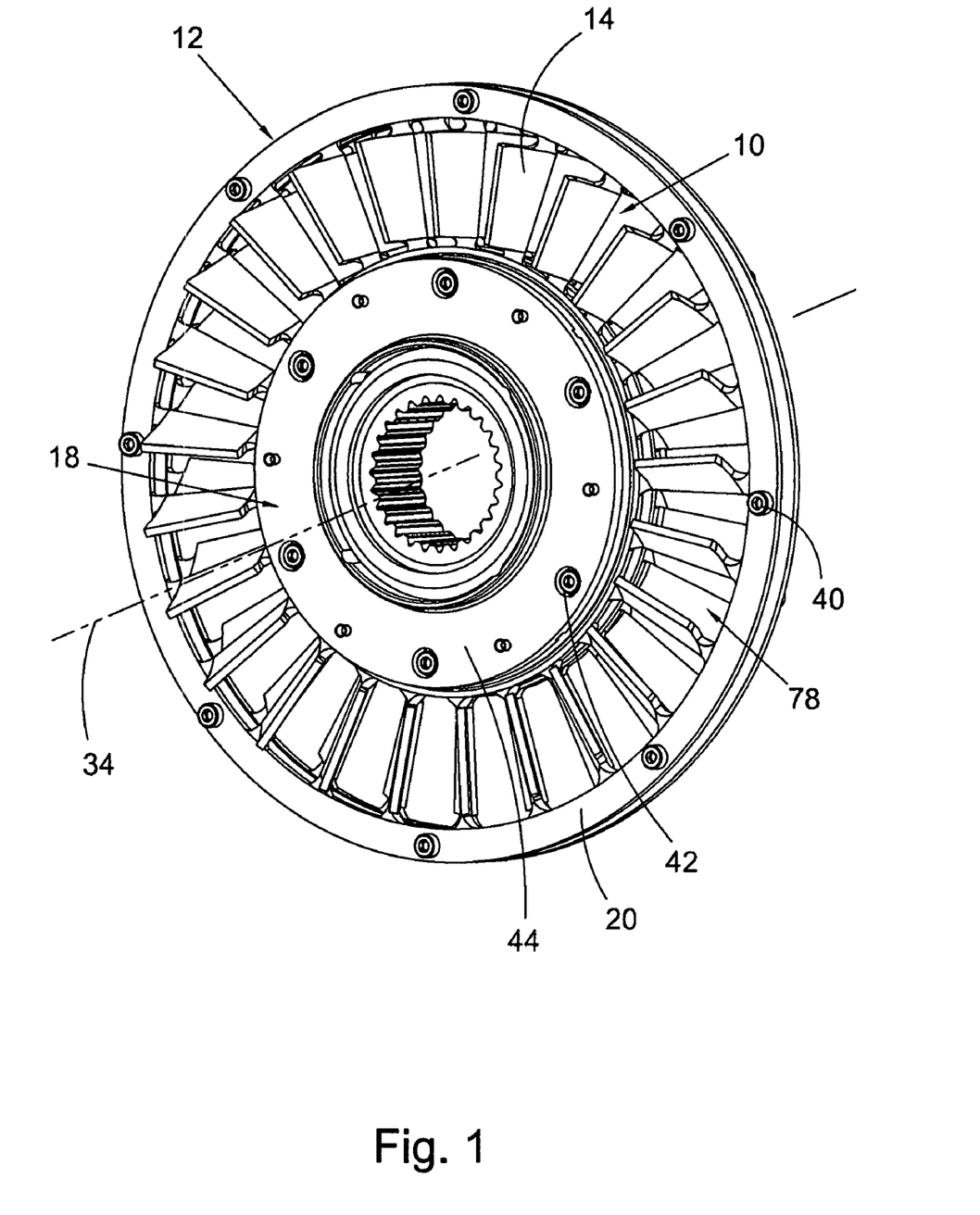
FIG. 1 is front perspective view of a stator with a present invention two-part blade.

FIG. 1 is front perspective view of a stator with present invention two-part blade 10.

Figure 2:
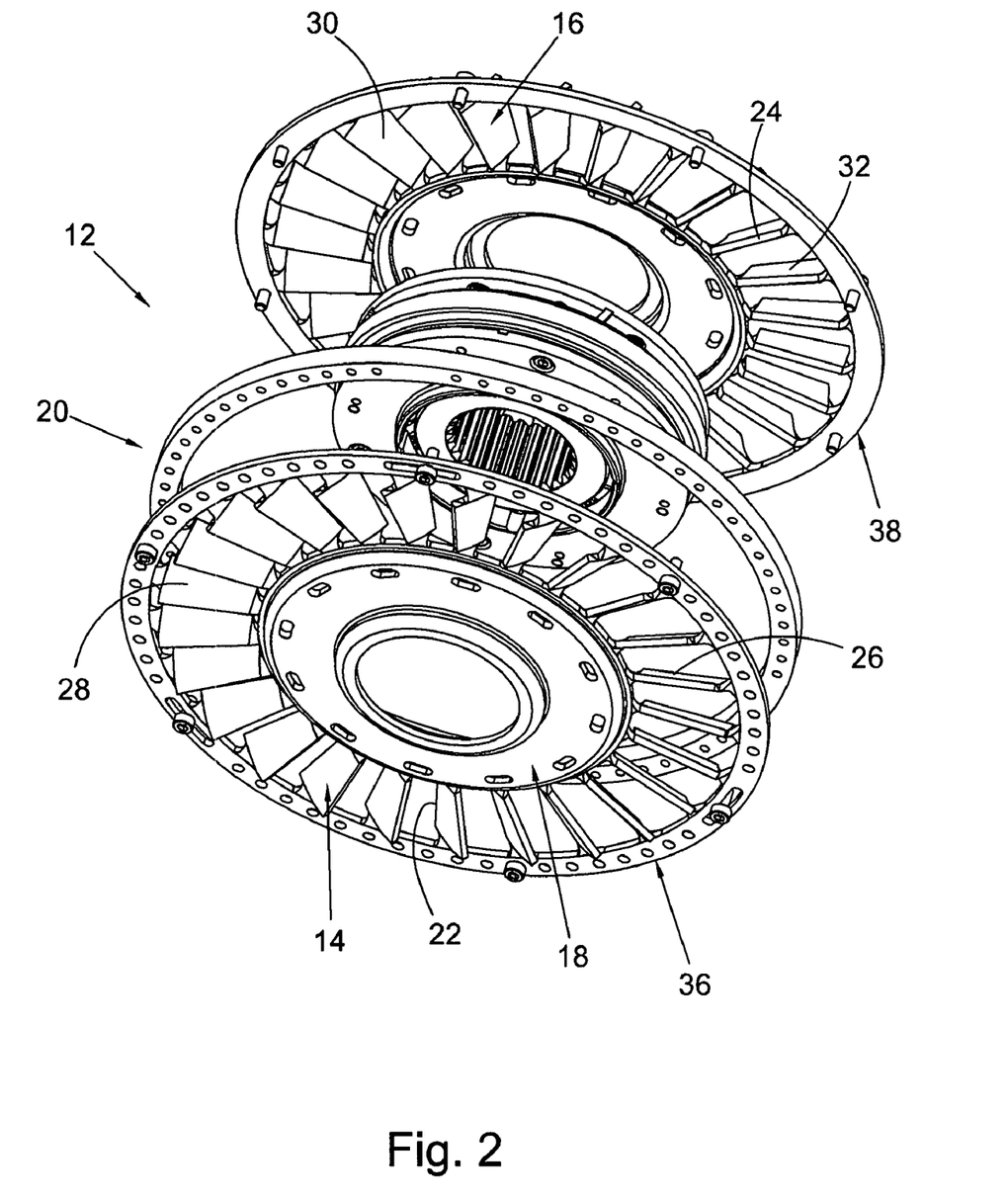
FIG. 2 is a front exploded view of the stator in FIG. 1.

FIG. 2 is a front exploded view of the stator in FIG. 1.

Figure 3:
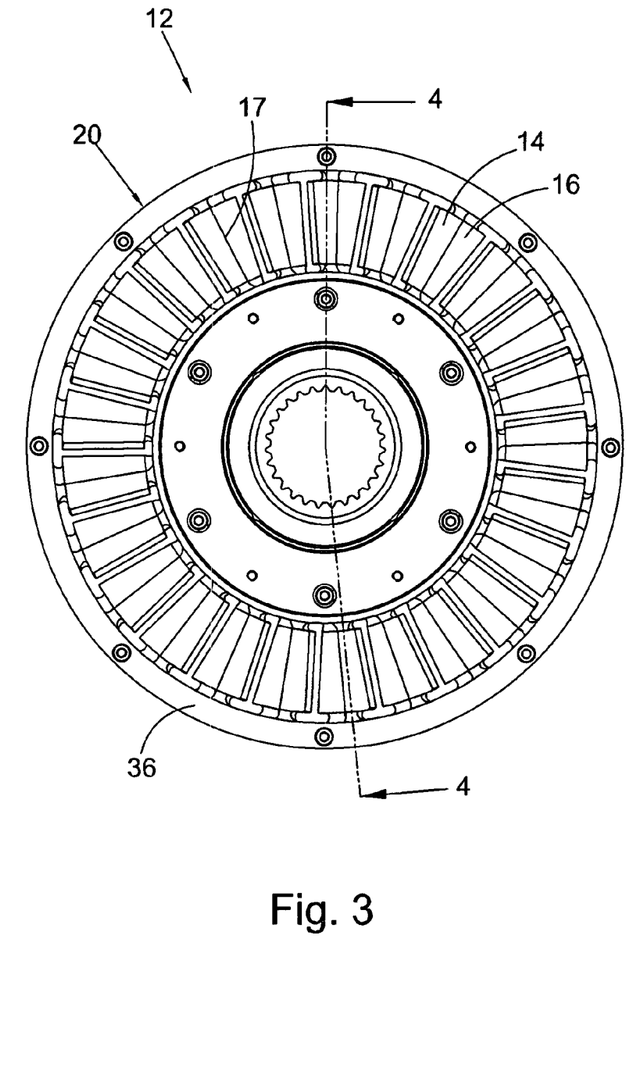
FIG. 3 is front view of the stator in FIG. 1.

FIG. 3 is front view of the stator in FIG. 1.

Figure 4:
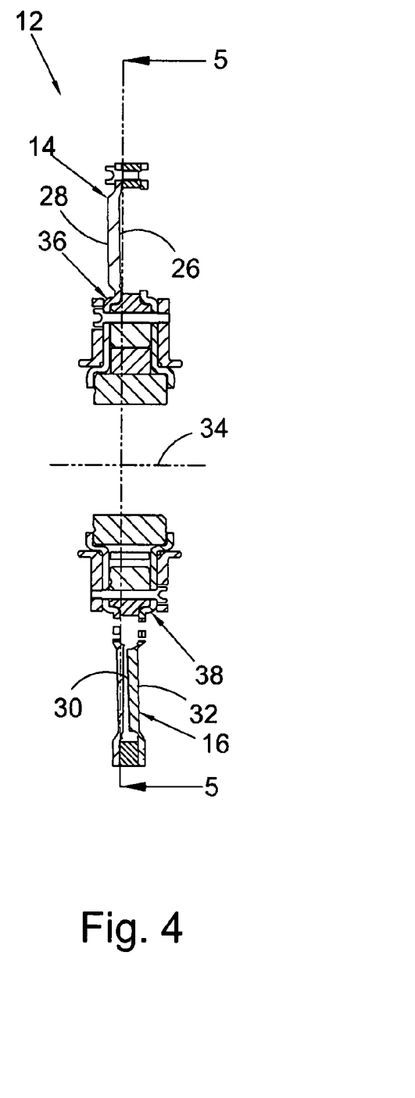
FIG. 4 is a cross-sectional side view of the stator in FIG. 3 along line 4-4 in FIG. 3.

FIG. 4 is a cross-sectional side view of the stator in FIG. 3 along line 4-4 in FIG. 3.

Figure 5:
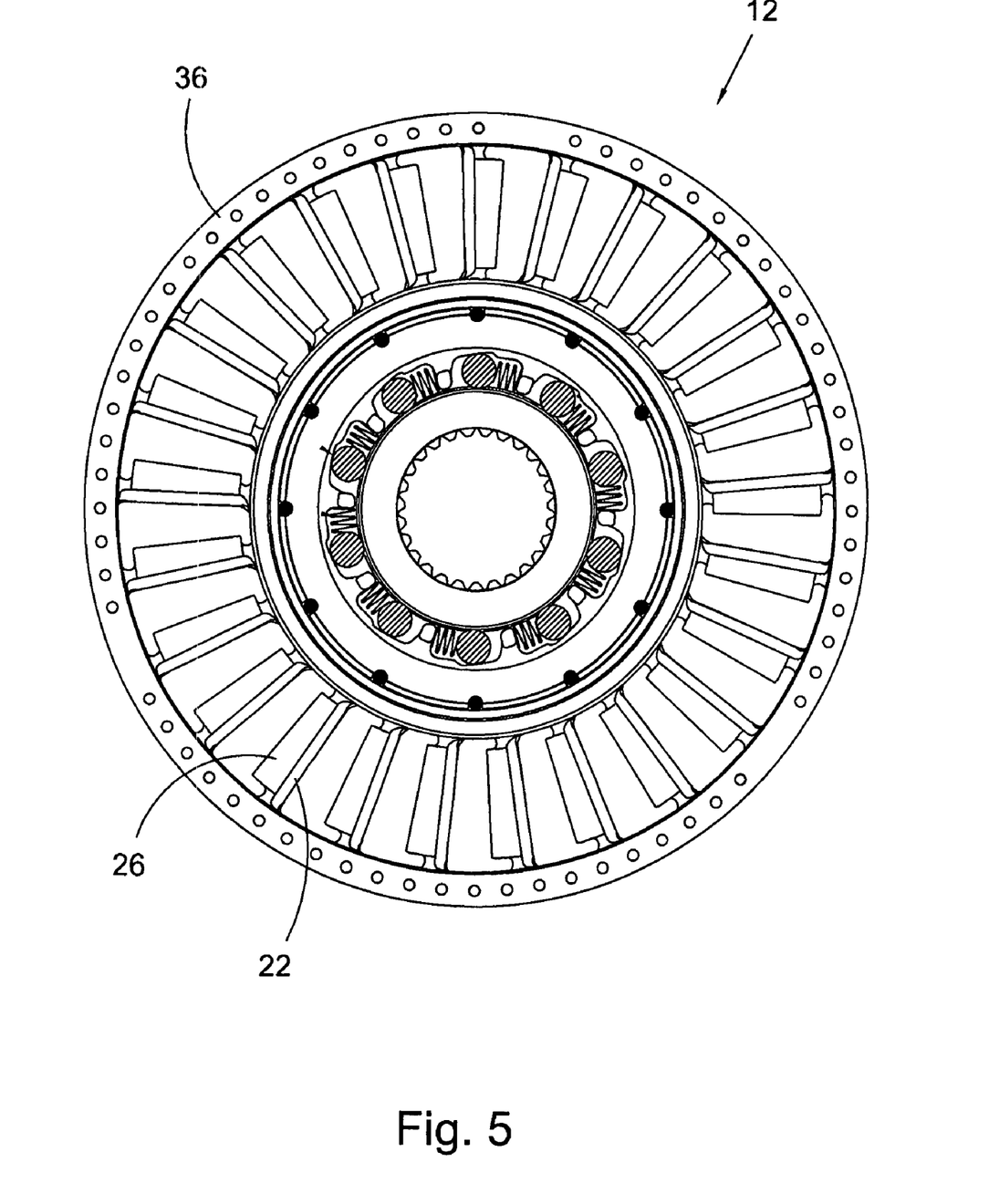
FIG. 5 is a cross-sectional back view of the stator in FIG. 4 along line 5-5 in FIG. 4.

FIG. 5 is a cross-sectional back view of the stator in FIG. 4 along line 5-5 in FIG. 4. The following should be viewed in light of FIGS. 1 through 5. Blades 10 are shown in stator 12. In some aspects, each blade 10 includes blade segments 14 and 16. Segments 14 and 16 are separately formed. That is, segments 14 and 16 are distinct. Thus, stator 12 is formed with "composite" blades formed from two separate pieces or segments. The separate pieces or segments can be connected, joined, placed in contact, aligned, or configured as described infra. Segments 14 and 16 are each connected to inner circumferential section 18 and outer circumferential section 20 of stator 12. That is, the segments are continuous between sections 18 and 20.

In the figures, each blade 10 is shown with corresponding segments 14 and 16. However, it should be understood that the present invention is not limited to a one-to-one ratio of segments 14 and 16. That is, blades 10 can be formed with differing numbers of segments 14 and 16. For example, a certain number of blades 10 could be formed with both segments 14 and 16, another number could be formed with only segments 14, and yet another number could be formed with only segments 16.

Segments 14 and 16 can be configured in a variety of ways to form blade 10. In some aspects, the segments are in contact, for example, along lines 17 as shown in FIGS. 1 through 3. For example, segments 14 and 16 are in contact along radial edges 22 and 24, respectively. In some aspects, one or both of edges 22 and 24 are coined, as further described infra. Segments 14 and 16 include radial surfaces 26 and 28 and 30 and 32, respectively. In some aspects, respective radial surfaces from segments 14 and 16 are at least partially overlapped, as further described infra. In some aspects (not shown), segments 14 and 16 are circumferentially misaligned, as further described infra.

It is well known that stators can be viewed in light of performance characteristics, including, but not limited to torque ratio, efficiency, and capacity. In general, these characteristics are influenced by the blades of the stator, for example, the configuration of the blades. Therefore, respective configurations of blades 10 and blade segments 14 and 16 can be selected to modify the performance characteristics of a stator housing blades 10. The configuration of the blades and blade segments can be with respect to axial, radial, or circumferential alignment. Of particular interest is the alignment of the blades with respect to the expected direction of fluid flow in the stator.

In some aspects, stator 12 includes halves 36 and 38, for example, two axially distinct halves as described in the commonly assigned U.S. Provisional Patent Application titled "INTEGRAL STATOR AND ONE-WAY CLUTCH," inventors George et al., filed the same day as the: present invention. By halves, we mean that the structure for the stator, in particular, the structure to which the blades are connected, is substantially formed by halves 36 and 38. Halves 36 and 38 also can be referred to as axial halves or axial ends. Alternately stated, halves 36 and 38 are corrected along a radial plane with respect to axis 34. The halves are each formed from single pieces, respectively. That is, the halves are separately formed. Blade segments 14 are connected to half 36 and blade segments 16 are connected to half 38. In some aspects, segments 14 are formed integrally with half 36 and blade segments 16 are formed integrally with half 38. For example, segments 14 and half 36 are formed from a single piece of material.

In general, the halves are connected and axially fixed. That is, the halves are connected in some fashion and in general, do not move axially with respect to each other. In some aspects, the halves are fixedly connected. That is, the halves do not move axially or rotationally with each other. In some aspects, the halves are arranged to move rotationally with respect to each other, as described infra. In FIGS. 1 through 4, fasteners 40 and 42 are used to connect the halves. However, it should be understood that other means, for example, as described infra and including, but not limited to, rivets, folded tabs, welds, adhesive, and crimps, can be used to connect the halves.

FIGS. 6 through 9 are partial cross-sectional views of stators with present invention blades, showing configurations of respective stators and blades. The following should be viewed in light of FIGS. 1 through 9. In some aspects, halves 36 and 38 are configured to form a portion of one-way clutch 44, as described in the commonly assigned U.S. Provisional Patent Application titled "STATOR AND ONE-WAY CLUTCH ASSEMBLY FOR A TORQUE CONVERTER," inventors Hemphill et al., filed the same day as the present invention. For example, stators 12A-D include one-way clutch 44 having inner race 46, rollers 48, and outer race 50 and, halves 36 and 38 respectively, are arranged to form axial ends 52 and 54, respectively, of the clutch. Alternately stated, ends 52 and 54 axially restrain the races and rollers of the clutch. It should be understood that the use of other one-way clutches in the stators is within the spirit and scope of the invention as claimed.

Blades 10, segments 14 and 16, and halves 36 and 38 are not limited to a particular configuration, shape, size, alignment, or connection. In FIGS. 6 through 9, axial location is with respect radial line 58 (shown only in FIG. 9, but applicable to the remaining figures), axially centered on clutch 44. In general, respective halves of stators 12 are joined at one or both of inner circumferential region 62 and outer circumferential region 64.

Figure 6:
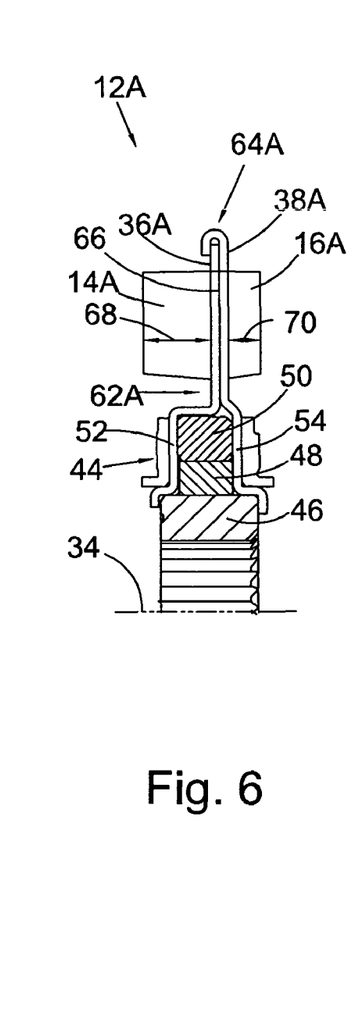
FIGS. 6 through 9 are partial cross-sectional views of stators with present invention blades, showing configurations of respective stators and blades.
Figure 9:
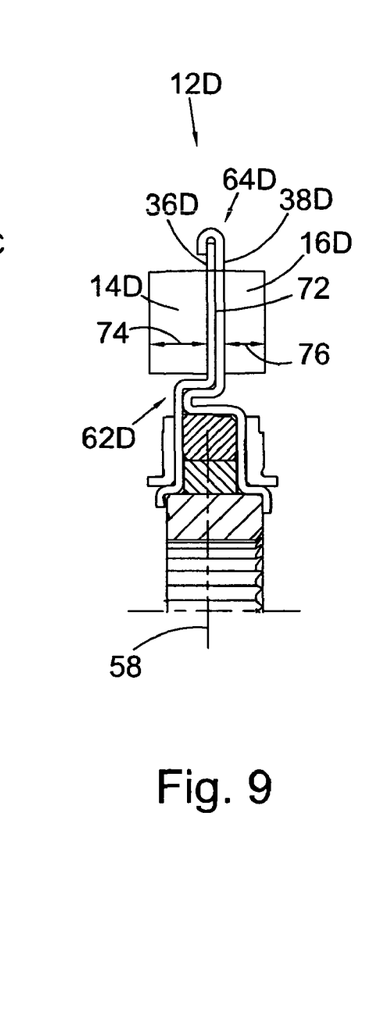

In FIGS. 6 and 9, halves 36A/38A and 36D/38D are formed such that regions 62A and 62D are axially off-center. In stator 12A, halves 36A and 38A are axially in contact along line 66, which is axially off-center. As a result, axial dimension 68 is larger than axial dimension 70, while maintaining a general axial alignment of blades 10 with line 58. This arrangement is useful for those aspects in which it is desirable to emphasize aspects of the leading portions of blades 10, for example, increase the surface area of the leading portion. In stator 12D, line 72 is substantially axially aligned with line 58 and dimension 74 also is greater than dimension 76, potentially emphasizing aspects of the leading aspects of blades 10.

Figure 7:
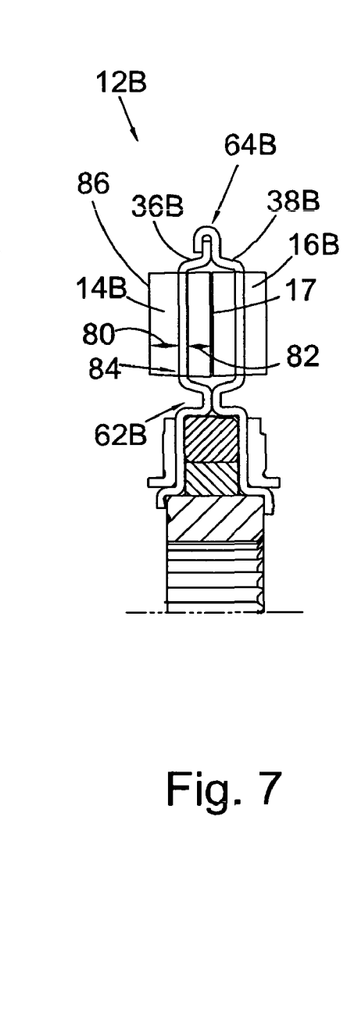
Figure 8:
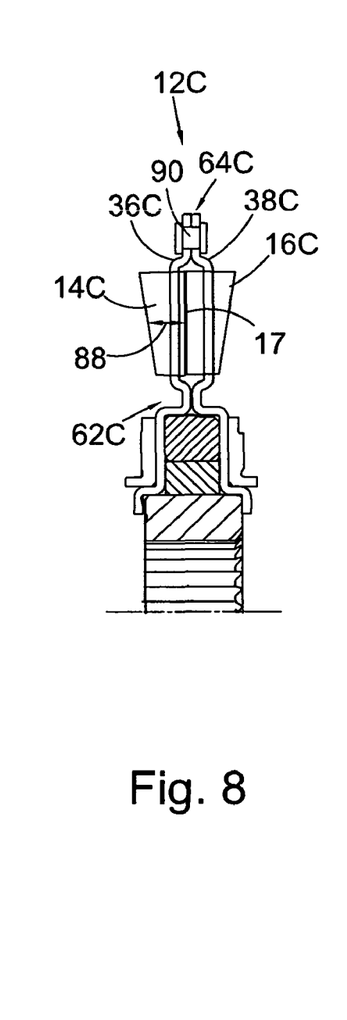

In FIGS. 7 and 8, the halves are axially separate in the respective annulus of the stator, that is, in the radial region in which the blades are located. For reference, annulus 78 is shown in FIG. 1. Regions 62B and 64B and 62C and 64C are substantially in axial alignment with line 58. One effect of the configuration shown in FIGS. 7 and 8 is that the blade segments, for example, 14B and 16C are secured to the respective halves in locations that are axially centered on the respective segments. For example, axial dimensions 80 and 82 for segment 14B are substantially equal. Such an arrangement can reduce the torque forces on the segments (forces acting to turn or twist a segment about a radial line), by reducing the distance from the connection points of the segments to respective edges of the segments, for example, distance 80 from point 84 to edge 86 of segment 14B. In FIG. 8, segments 14C and 16C are shown with a radial taper. For example, axial dimension 88 of segment 14C is greater near region 64C than near region 62C. It should be understood that other types and degrees of tapering of the blade segments are within the spirit and scope of the invention as claimed. For example, dimension 88 could greater at region 62C than at region 64C.

Any means known in the art can be used to join respective halves in regions 64. For example, a fold, tab, or crimp connection is shown in FIGS. 6, 7, and 9, and rivets 90 are used in FIG. 8. In addition, other means, including, but not limited to welding can be used.

Figure 10:
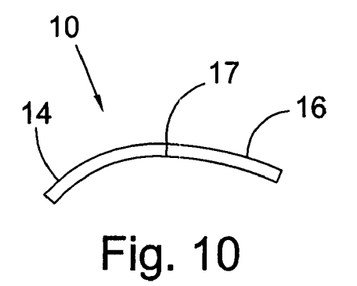
FIGS. 10 through 17 are top views of present invention blades showing various configurations of the blades.
Figure 11:
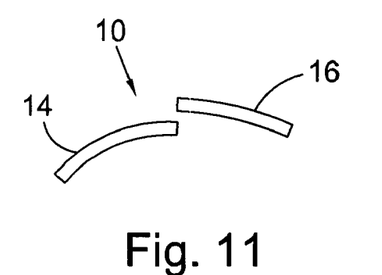
Figure 12:
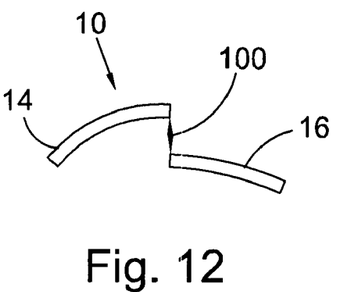

FIGS. 10 through 17 are top views of present invention blades showing various configurations of the blades. The following should be viewed in light of FIGS. 1 through 17. To simplify the presentation, the various combinations and configurations shown in FIGS. 10 through 17 use blade 10 and segments 14 and 16 from FIGS. 1 through 5 as a reference. FIG. 10 shows blade 10 with segments 14 and 16 joined axially along line 17. This is the configuration shown in FIGS. 1 through 5. FIGS. 11 and 12 shown segments 14 and 16 with a circumferential off-set. As shown in FIGS. 11 and 12, segment 16 can be circumferentially off-set on either side of segment 14. It should be understood that the off-set can be viewed with segment 16 as the reference point. Blade 10 is not limited to a particular amount of circumferential off-set 100 between segments.

Figure 13:
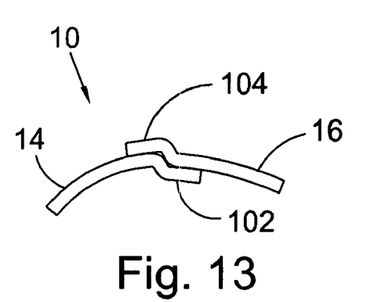
Figure 14:
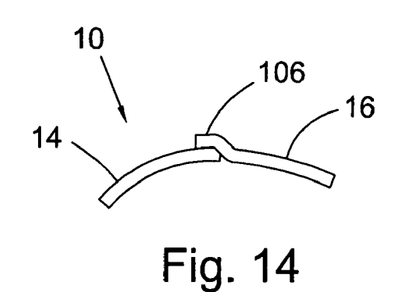

FIGS. 13, and 14 show segment 14 and 16 joined by overlap. FIG. 13 shows a double overlap. That is, portion 102 of segment 14 and portion 104 of segment 16 are manipulated or formed. FIG. 14 shows a single overlap. That is, only portion 106 of segment 16 is manipulated or formed. It should be understood that the lapping shown in FIGS. 13 and 14 can be reversed, for example, a single overlap can be formed by manipulating segment 14. Blade 10 is not limited to any particular degree or configuration of overlapping.

Figure 15:
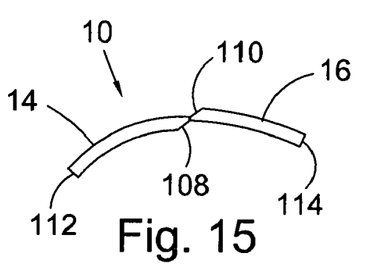

FIG. 15 shows segments 14 and 16 with coined edges 108 and 110, respectively. It should be understood that other configurations of segments can have coined edges. For example, segment 14 or 16 in FIG. 11 or 14 can be coined. Also, in FIG. 15, other combinations of coined edges are possible. For example, edges 112 or 114 could be coined. Blade 10 is not limited to any particular type of coining or combination of coined edges.

Figure 16:
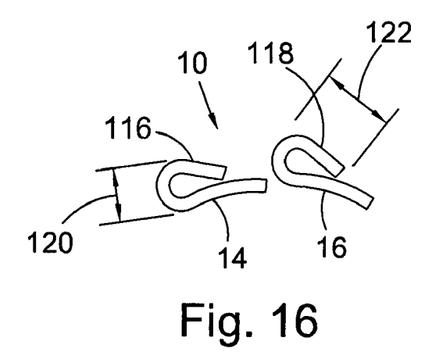
Figure 17:
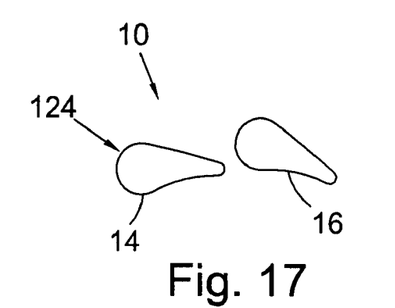

FIG. 16 shows blade 10 with segments 14 and 16 at least partially folded. For example, front edges 116 and 118 of segments 14 and 16, respectively, have been folded over. Blade 10 is not limited to any particular type, degree, or configuration of folding. For example, dimensions 120 and 122 can be varied. Also, only one of segment 14 or 16 in blade 10 can be folded, leaving the remaining segment unfolded. FIG. 17 shows substantially tear-shaped segments formed by casting or molding. Such segments can be cast in a variety of sizes, shapes, and configurations to present surfaces 124, for example, having desired curvatures and surface characteristics.

In some aspects, the circumferential off-set shown in FIGS. 11 and 12 is adjustable. For example, at least portions of either or both of halves 36 and 38 are circumferentially adjustable. This adjustment can be non-automatic. For example, the circumferential relationship of halves 36 or 38 in FIGS. 1 and 2, and hence the circumferential alignment of segments 14 and 16 in blades 10, can be selected by rotating one or both of the halves to the desired alignment and then attaching the halves using fasteners 40 and 42.

In some aspects (not shown), the adjustment is automatic. That is, stator 12 includes an automatic alignment element or adjustment device for at least a portion of one or both of halves 36 and 38. For simplicity sake, the adjustment is referenced with respect to the halves in the discussion that follows, however, it should be understood that halves can refer to only a portion of the respective half. The device controls rotation of the halves (to modify circumferential off-set of segments 14 and 16 in blades 10) in response to selected control parameters. In some aspects, the device is mechanical, for example, a resistive element that provides a "live" resistance to maintain a specified off-set under certain operating conditions in the stator. As the operating conditions in the stator change, forces in the stator opposing the resistance change, causing the halves to rotate with respect to each other. In response, the specified off-set of the blade segments is altered as well. For example, the resistive element could be a spring and the compression of the spring changes in response to changes in fluid pressure on the blades of the stator. As an example, an increase in fluid pressure could cause the spring to compress. Any resistive device known in the art can be used for the resistive element.

In some aspects, the alignment element is electromechanical. For example, electric actuators or electromechanical devices connected to halves 36 and 38 rotate the halves in response to control signals. The control signals can be generated by any means known in the art, including, but not limited to sensors measuring parameters in the stator, such as fluid pressure or flow, or sensors monitoring operating parameters of a drive unit or driven unit for a vehicle housing the stator.

Blades 10, segments 14 and 16, and halves 36 and 38 can be made using any means known in the art. For example, the blades, segments, or halves can be formed by stamping or casting. Combinations of fabricating means can be used together. For example, stamped blades 10 could be used with cast halves.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A blade for a stator in a torque converter, comprising:
   a first blade segment formed, by stamping, from a same first piece of material as first inner and outer circumferential sections of said stator; and,
   a second blade segment, formed, by stamping, from a same second piece of material as second inner and outer circumferential sections, wherein:
      the first and second pieces of material are different one from the other;
      the first and second outer circumferential sections are disposed radially beyond the first and second blade segments, respectively, and fixedly connected to each other; and,
      said fixed connection is selected from the group consisting of rivets, folded tabs, welds, adhesive, and crimps.

2. The blade of claim 1 wherein said first and second blade segments are in contact.

3. The blade of claim 2 wherein said first and second blade segments further comprise respective edges and said first and second blade segments are in contact along said respective edges.

4. The blade of claim 3 wherein at least one of said respective edges is coined.

5. The blade of claim 2 wherein said first and second blade segments further comprise respective surfaces and said respective surfaces are at least partially overlapped.

6. The blade of claim 1 wherein said first and second blade segments are circumferentially off-set.

7. The blade of claim 1 wherein said stator further comprises performance characteristics, said first and second blade segments are in respective configurations, and said respective configurations are selected to modify said performance characteristics.

8. The blade of claim 7 wherein said performance characteristics are selected from the group consisting of torque ratio, efficiency, and capacity.

9. The blade of claim 7 wherein said respective configurations are selected from the group consisting of axial, radial, and circumferential alignment.

10. The blade of claim 1 wherein said first and second blade segments are in a circumferential alignment, and said stator further comprises an alignment element operatively arranged to control said circumferential alignment.

11. The blade of claim 10 wherein said torque converter further comprises fluid and said alignment element is arranged to control said alignment in response to pressure from said fluid upon said blade.

12. The blade of claim 1 wherein said stator further comprises a first axial half and a second axial half, said first and second axial halves are separately formed and fixedly connected, said first blade segment is connected to said first axial half, and said second blade segment is connected to said second axial half.

13. The blade of claim 12 wherein said fixed connection is selected from the group consisting of rivets, folded tabs, welds, adhesive, and crimps.

14. The blade of claim 12 wherein said first blade segment is formed integrally with said first axial half and said second blade segment is formed integrally with said second axial half.

15. The blade of claim 12 wherein said stator further comprises a clutch and said first and second axial halves are arranged to form first and second axial ends of said clutch, respectively.

16. The blade of claim 1 wherein said first blade segment is at least partially folded.

17. The blade of claim 1 wherein said second blade segment is at least partially folded.

18. The blade of claim 1 wherein said blade is cast.

19. The blade of claim 1 further comprising: a plurality of blades; and, wherein said first and second blade segments further comprise respective pluralities of said first and second blade segments.

20. A stator in a torque converter, comprising:
   a first portion including:
      first annular inner and outer circumferential sections; and,
      a first plurality of blade segments formed of a first same piece of material as the first inner and outer circumferential sections and non-adjustably fixed with respect to the first inner and outer circumferential sections; and,
   a second portion including:
      second annular inner and outer circumferential sections; and,
      a second plurality of blade segments formed of a second same piece of material as the second inner and outer circumferential sections and non-adjustably fixed with respect to the second inner and outer circumferential sections, wherein:

the first and second annular inner circumferential sections are connected to each other;

the first and second annular outer circumferential sections are connected to each other;

respective blade segments from the first and second pluralities of blade segments are partially aligned in an axial direction with each other; and, the partially aligned respective blade segments include respective ends closest to each other and separated by a respective space in a circumferential direction.

21. A stator in a torque converter, comprising:

a first portion including:

first annular inner and outer circumferential sections; and, a first plurality of blade segments formed of a first same piece of material as the first inner and outer circumferential sections and non-adjustably fixed with respect to the first inner and outer circumferential sections; and, a second portion including:

second annular inner and outer circumferential sections; and, a second plurality of blade segments formed of a second same piece of material as the second inner and outer circumferential sections and non-adjustably fixed with respect to the second inner and outer circumferential sections, wherein:

the first and second annular inner circumferential sections are connected to each other;

the first and second annular outer circumferential sections are connected to each other;

respective blade segments from the first and second pluralities of blade segments are partially aligned in an axial direction with each other; and, the partially aligned respective blade segments have substantially the same shape and size in a cross-section taken in a circumferential direction.

* * * * *